United States Patent [19]

Verger et al.

[11] 4,154,662

[45] May 15, 1979

[54] PROCESS AND APPARATUS FOR THE ELECTROLYTIC PRODUCTION OF HYDROGEN

[75] Inventors: Bernard Verger, Chevreuse; Philippe Demange, Verrieres le Buisson, both of France

[73] Assignee: Alsthom-Atlantique, Paris, France

[21] Appl. No.: 891,353

[22] Filed: Mar. 29, 1978

[30] Foreign Application Priority Data

Apr. 5, 1977 [FR] France .................. 77 10208

[51] Int. Cl.² .................. C25B 1/02; C25B 11/10
[52] U.S. Cl. .................. 204/129; 204/293
[58] Field of Search .................. 204/293, 129, 242

[56] References Cited

U.S. PATENT DOCUMENTS 4,080,278  3/1978  Ravier et al. .................. 204/293

*Primary Examiner*—R. L. Andrews
*Attorney, Agent, or Firm*—Sughrue, Rothwell, Mion, Zinn and Macpeak

[57] ABSTRACT

An electrolyzer for an alkaline aqueous solution and having an anode and a cathode wherein at least the cathode is made of a ternary alloy of nickel-beryllium-titanium, the proportions of beryllium and titanium being respectively 1 to 3% and 0.1 to 1% by weight. The electrolyzer is preferably used at temperatures above 110° C. and at high current densities.

6 Claims, 4 Drawing Figures

PROCESS AND APPARATUS FOR THE ELECTROLYTIC PRODUCTION OF HYDROGEN

FIELD OF THE INVENTION

The present invention relates to an electrolyser, and more particularly to an electrolyser for basic aqueous solutions. It also relates to a method of using the electrolyser.

BACKGROUND OF THE INVENTION

It is known that nickel in the form of plates or grids is used as the electrode material in such electrolysers particularly when they are suitable for producing hydrogen by electrolysis of an aqueous solution of concentrated potash.

It is also known that the voltage required to perform the electrolysis can be reduced by increasing the temperature of the electrolyte.

Nonetheless, while such an increase turns out to be beneficial up to a temperature of about 80° to 100° C., at higher temperatures the advantageous effect is noticeably less marked, particularly when taking account of the high current densities which are used in industrial electrolysers.

Preferred embodiments of the present invention mitigate the drawbacks outlined above.

The invention provides an electrolyser for an alkaline aqueous solution and having an anode and a cathode wherein at least the cathode is made of a ternary alloy of nickel-beryllium-titanium; the proportions of beryllium and titanium being respectively 1 to 3% and 0.1 to 1% by weight.

Preferably the operating temperature of the alkaline aqueous solution is at least 110° C.

An embodiment of the invention is described by way of example with reference to the accompanying drawings.

DESCRIPTION OF THE PREFERRED EMBODIMENT

Figure 1:
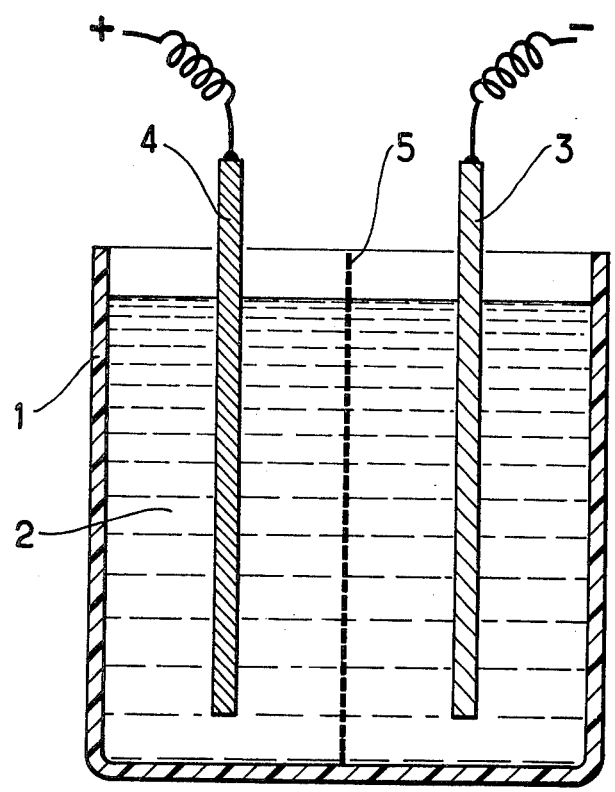
FIG. 1 is a schematic representation of an electrolyser in accordance with the invention.

In FIG. 1, the electrolyser comprises a tank 1 containing an electrolyte 2 constituted, for example, by an aqueous solution of potash at a concentration in the order of 30 to 50% by weight. The electrodes i.e. a cathode 3 and an anode 4 are immersed in this electrolyser, and a separator 5 known per se may be disposed between the electrodes.

During electrolysis oxygen is evolved at the anode 4, while hydrogen is evolved at the cathode 3.

In accordance with the invention at least the cathode 3 is made of a ternary alloy of nickel-beryllium-titanium, having 1 to 3% beryllium and 0.1 to 1% titanium by weight.

For preference an alloy containing 1.95% beryllium and 0.5% titanium is used.

The anode 4 is made either of nickel or of the alloy as described above. Further, the temperature of the electrolyte is at least equal to 110° C. and is preferably 130° C.

Figure 2:
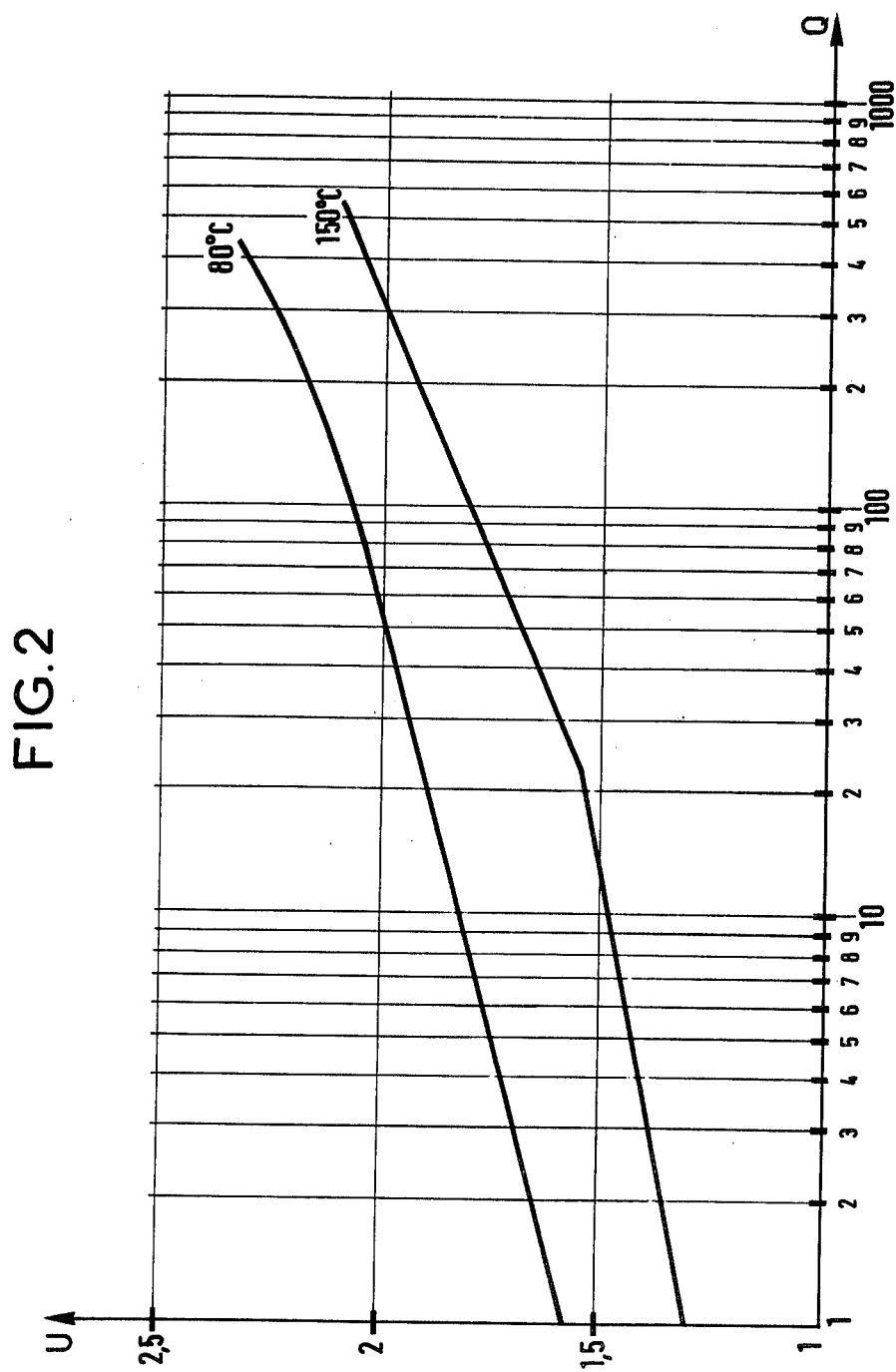
FIGS. 2 to 4 are graphs enabling the advantages of the electrolyser in accordance with the invention to be better understood.
Figure 3:
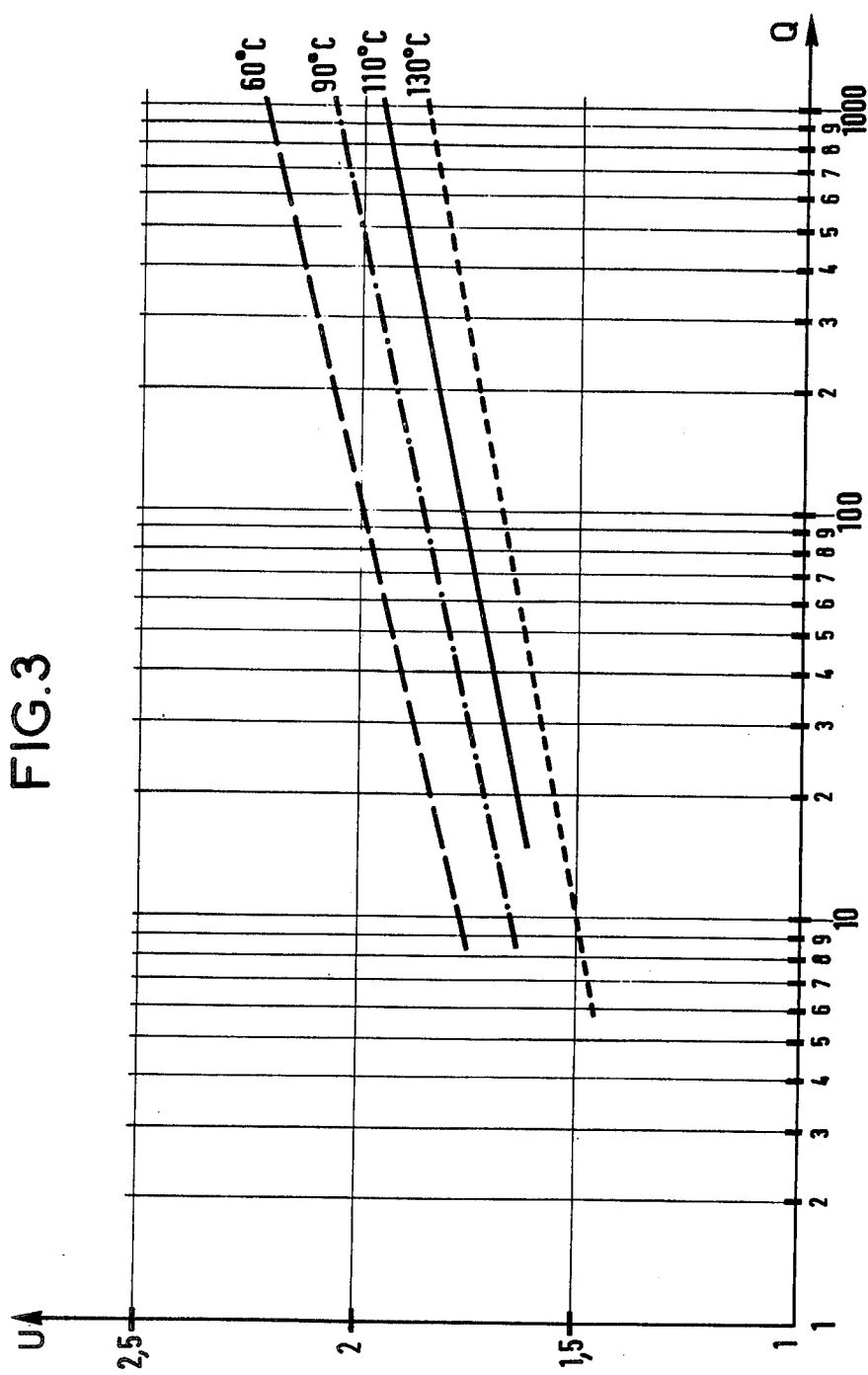
Figure 4:
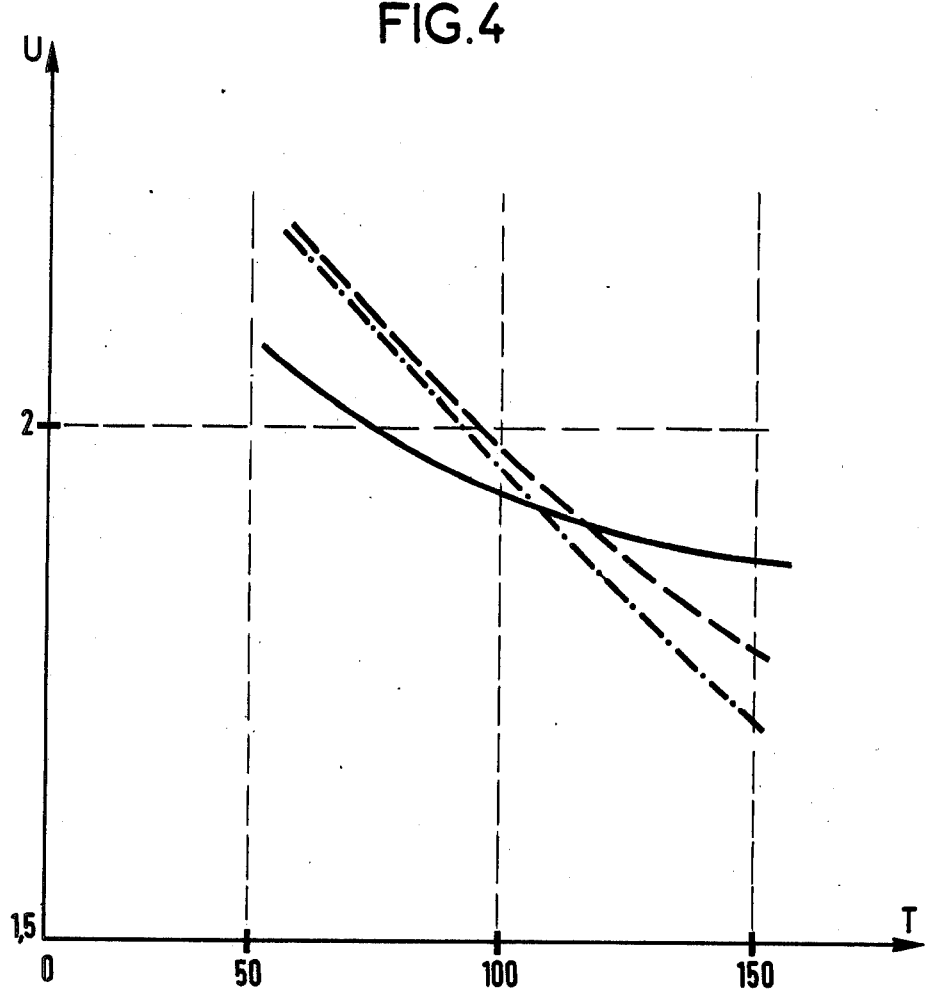

The advantages and other characteristics of the invention will now be brought to light with reference to the graphs established experimentally by the applicant and shown in FIGS. 2 to 4.

In FIG. 2 the electrolysing tension U in volts is shown as a function of the current density Q expressed in $mA/cm_2$ for two temperatures i.e. 80° C. and 150° C.

The electrodes are of polished nickel and the electrolyte is an aqueous solution of 50% potash by weight.

The two curves shown on the figure show that while an increase in temperature enables the electrolysing voltage to drop noticeably, such a reduction is nonetheless less marked at high current densities in the order of 200 $mA/cm^2$ and above, which densities are used in industrial electrolysers.

With reference to FIG. 3 the electrolysing tension U in volts is again shown as a function of the logarithm of the current density Q expressed in $mA/cm^2$ for temperatures of 60° C., 90° C., 110° C. and 130° C. The electrolyte is likewise an aqueous solution of 50% potash by weight.

But, in accordance with the invention the electrodes are made from a nickel-beryllium-titanium alloy as has been described above.

An examination of these curves show that the benificial effect of increasing the temperature is maintained for high current densities rising even to 600 $mA/cm^2$ in contrast with the preceding case.

With reference now to FIG. 4 the electrolsing tension U is shown as a function of temperature for various electrode materials.

It can be seen that above a temperature of 110° C., the use of a cathode in accordance with the invention (dashed curve) enables the electrolsing tension to be reduced with respect to nickel electrodes (solid curve). Such an advantage is further accentuated when the anode is also made of alloy in accordance with the invention (dot-dashed curve).

To be specific, at a temperature of 130° the electrolsing tension is 1.82 volts giving a gain of 0.1 volts with respect to nickel electrodes (everything else being equal) and this is true at high current densities.

Such an advantage is further maintained over time since tests performed for about 150 hours have not shown any noticeable variation of the electrodes in accordance with the invention.

The electrolyser in accordance with the invention thus enables stable operation and large energy savings even when using high current densities.

Advantageous applications can be found in industrial installations for producing electrolytic hydrogen.

Naturally the invention is in no way limited to the embodiments described and shown, but on the contrary covers all variants thereof.

It is quite obvious that the materials as claimed can be used in any kind of electrolyser and in particular in filter-pressed type electrooyser.

What is claimed is:

1. An electrolyser for alkaline aqueous solution and having an anode and a cathode, the improvement wherein at least the cathode is made of a ternary alloy of nickel-beryllium-titanium, the proportions of beryllium and titanium being respectively 1 to 3% and 0.1 to 1% by weight.

2. An electrolyser according to claim 1, wherein the said ternary alloy has about 1.95% beryllium and about 0.5% titanium.

3. An electrolyser according to claim 1 wherein the anode is made of nickel.

4. An electrolyser according to claim 1 wherein the anode is made of the same ternary alloy as the cathode.

5. In an electrolytic process of producing hydrogen comprising the steps of effecting an electrolyzing tension between spaced cathode and anode electrodes immersed within an alkaline aqueous solution, the improvement wherein:

at least the cathode electrode is made of a ternary alloy of nickel-beryllium-titanium, the proportions of beryllium and titanium being respectively 1 to 3% and 0.1 to 1% by weight, and said method further includes the step of operating the temperature of the alkaline aqueous solution at at least 110° C.

6. A method according to claim 5 wherein the operating temperature is about 130° C.

* * * * *